(12) United States Patent
Giaretta et al.

(10) Patent No.: US 7,970,283 B2
(45) Date of Patent: *Jun. 28, 2011

(54) HIGH SPEED SFP TRANSCEIVER

(75) Inventors: Giorgio Giaretta, Mountain View, CA (US); Julie Sheridan Eng, Los Altos, CA (US); Thomas Gordon Beck Mason, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 11/074,609

(22) Filed: Mar. 7, 2005

(65) Prior Publication Data

US 2006/0198639 A1  Sep. 7, 2006

(51) Int. Cl.
*H04B 10/00* (2006.01)
(52) U.S. Cl. ......... 398/135; 398/138; 398/140; 398/164
(58) Field of Classification Search .......... 398/135–139; 359/152; 370/535; 372/34, 219; 385/88
See application file for complete search history.

(56) References Cited

U.S. PATENT DOCUMENTS

| | | | |
|---|---|---|---|
| 6,272,154 B1 * | 8/2001 | Bala et al. | 370/535 |
| 7,156,562 B2 * | 1/2007 | Mazotti et al. | 385/92 |
| 2002/0149821 A1 * | 10/2002 | Aronson et al. | 359/152 |
| 2003/0002108 A1 * | 1/2003 | Ames et al. | 359/152 |
| 2004/0022544 A1 * | 2/2004 | Case et al. | 398/137 |
| 2005/0003696 A1 | 1/2005 | Shirk | |

FOREIGN PATENT DOCUMENTS

| | | |
|---|---|---|
| GB | 2397408 | 7/2004 |
| JP | 2002051010 | 2/2002 |
| JP | 2005535271 | 11/2005 |
| TW | 200425588 | 11/2004 |
| WO | WO 2004/002023 | * 12/2003 |
| WO | 2005015798 | 2/2005 |

OTHER PUBLICATIONS

Priyadarshi et al: "The First Hot Pluggable 2.5 Gb/s DWDM Transceiver in an SFP Form Factor", IEEE Optical Communications, Feb. 2005, p. S29-S31.*
Abe et al: "Short Wave SFF Small Form Factor Transceivers", IEEE, 2001 Electronic Components and Technology Conference, May 29, 2001-Jun. 1, 2001, pp. 1-5.*
Hashimoto et al: "A Bidirectional Single Fiber 1.25 Gb/s Optical Transceiver Module with SFP Package Using PLC", 2003 Electronic Components and Technology Conference, p. 279-283.*
Vitesse: "SFP Pro Chipset and Reference Design", Oct. 2004.*
Vitesse: "Performance Study of 8.5G Links", Oct. 13, 2004.*

(Continued)

*Primary Examiner* — Li Liu
(74) *Attorney, Agent, or Firm* — Mashoff Gilmore & Israelsen (57) ABSTRACT

This disclosure concerns optoelectronic transceivers. In one example, a transceiver is implemented as an uncompensated architecture that is substantially compliant with the SFP MSA and is capable of effective operation at a data rate of about 8.5 Gb/s. The transceiver includes a TOSA, ROSA, a printed circuit board, an LDPA disposed on the printed circuit board and configured for communication with the TOSA and the ROSA. Finally, the transceiver includes SFP compliant optical and electrical connections.

18 Claims, 5 Drawing Sheets

OTHER PUBLICATIONS

Gomatam et al: "Performance Study of 8.5G Links", Oct. 13, 2004, ftp://ftp.t10.org/t11/document.04/04-661v1.pdf, pp. 1-13.*

Gomatam et al: "Performance Study of 8.5G Links", Oct. 13, 2004, ftp://ftp.t10.org/t11/document.04/04-661v1.pdf, pp. 1-13, and documents showing the publication date.*

Infeineon Technologies: "SPF—Small Form-factor Pluggable Multimode 850 nm 2.125 and 1.0625 Gbit/s Fiber Channel 1.25 Gigabit Ethernet Transceiver with LCTM Connector", Apr. 25, 2003, http://www.datasheetcatalog.org/datasheet/infineon/1-V23818_M305_B57_030425-1440.pdf, pp. 1-20.*

Priyadarshi, S. et al., "The First Hot Pluggable 2.5 Gb/s DWDM Transceiver in an SFP Form Factor", IEEE Optical Communications, Feb. 2005, pp. 529-531.

Abe,S., "Short Wave SFF Small Form Factor Transceivers", 2001 Electronic Components and Technology Conference.

* cited by examiner

HIGH SPEED SFP TRANSCEIVER

BACKGROUND OF THE INVENTION

1. Field of the Invention

The present invention relates generally to optical communication networks and associated systems, methods and devices. More particularly, embodiments of the invention are concerned with transceivers that achieve relatively high data rates without using CDR signal compensation, while nonetheless maintaining substantial compliance with applicable performance standards.

2. Related Technology

Data can be efficiently propagated through fiber optic networks and devices by the transmission of optical "1" and "0" digital signals. Maintenance of the integrity of the transmitted data, as well as the speed, or rate, at which the data is transferred relies in large part on the timing of the data. That is, the operation of fiber optic data transmission systems is predicated on the ability to reliably ensure that particular bits of data are transmitted at particular times.

To this end, typical fiber optic data transmission systems incorporate a clock signal that defines the time periods in which data is to be transmitted. The clock may be included in the data stream, or may take the form of a separate signal. The use of clock that is common to the transmitter and the receiver means that the same reference is employed for both data transmission and reception processes throughout the data transmission system. By synchronizing the data transmission system operations in this way, a relatively high degree of data integrity can be achieved.

As line rates move higher however, it becomes increasingly likely that the data will get out of sync with the clock, so that the data bits are not being transmitted precisely during the designated bit periods defined by the clock. This phenomenon is sometimes generally referred to as jitter. Jitter can be caused by environmental factors, circuit design, or by the system components themselves. Because no system performs ideally, typical fiber optic data transmission systems are designed to tolerate a certain amount of jitter without experiencing materially adverse effects in terms of overall system performance. The amount of jitter that can be safely tolerated is sometimes referred to as the jitter budget of the system, or of a component. Significant problems may arise however, when the jitter budget is exceeded.

In particular, excessive jitter can result in data pulse overlap so that a particular data pulse moves forward into the preceding data pulse, or backward into the succeeding data pulse. As a result, the receiver may not be able to detect the presence or absence of a particular pulse, and data integrity is lost.

As technology advances and line rates correspondingly increase, jitter presents an increasingly significant problem. Consequently, various devices and systems have been developed in an attempt to maintain jitter and, accordingly, data integrity, at an acceptable level. One approach that has been employed involves the use of circuits that attempt to compensate for jitter by reshaping and retiming the data stream at various points in the fiber optic communications network so that the jitter budget is not exceeded. The processes of reshaping and retiming the data are sometimes collectively referred to as clock and data recovery ("CDR").

While the CDR approach to jitter compensation has proven useful in some applications, the incorporation of CDR circuits and devices complicates the design, construction, and operation of the transceiver. Correspondingly, the use of CDR circuits and devices also increases the cost of the transceiver.

A related problem is that while transceivers exist that do not employ CDR functionality, those transceivers have inherent limitations. In particular, transceivers that do not employ CDR functionality are generally able to avoid the use of CDR circuits and devices because those transceivers operate at relatively low data rates.

ASPECTS OF AN EXEMPLARY EMBODIMENT OF THE INVENTION

In view of the problems in the field that have been identified herein, and other problems not specifically addressed here, it would be useful to provide a transceiver module that employs a simplified architecture without CDR compensation, while also achieving relatively high data rates in a manner that is substantially compliant with various performance and other standards. Accordingly, embodiments of the invention are generally concerned with optoelectronic transceivers that employ a relatively low speed architecture that is nonetheless capable of achieving relatively high data rates without requiring CDR or comparable data signal integrity compensation.

One exemplary embodiment of the invention is concerned with a Fibre Channel compatible transceiver that is generally implemented in the form of a 4 G SFP transceiver, although some exceptions may apply with regard to particular embodiments. Because the transceiver is generally compliant with the SFP MSA, no CDR data signal integrity compensation is implemented in the exemplary transceiver. That is, the SFP architecture, as provided for in the SFP MSA, does not include or implement CDR data signal integrity compensation.

Among other things, the exemplary transceiver includes an integrated post-amplifier and laser driver ("LDPA") in communication with a transmitter optical subassembly ("TOSA") and receiver optical subassembly ("ROSA"), where the ROSA and TOSA are nominally rated for 10 Gb/s operation. The transceiver further includes digital diagnostics systems and functionality, implemented in part by a diagnostics control chip ("DCC") that interfaces with both internal and external devices. In this implementation, the DCC and the LDPA are located on opposing sides of the transceiver circuit board so as to facilitate efficient use of the space in the transceiver housing. Finally, the lengths of one or more traces of the transceiver are minimized to the extent that the exemplary implementation will permit, so as to enhance performance.

In this way, exemplary embodiments provide various useful results. For example, 8 G functionality is provided within a 4 G SFP architecture and form factor. Particularly, the 8 G data rate, and others, are achieved without necessitating the use of any CDR data signal integrity compensation, while maintaining compliance with performance standards for the transceiver.

BRIEF DESCRIPTION OF THE DRAWINGS

To further clarify the above and other aspects of embodiments of the present invention, a more particular description of the invention will be rendered by reference to specific embodiments thereof which are illustrated in the appended drawings. These drawings depict only typical embodiments of the invention and are therefore not to be considered limiting of its scope. In addition, the drawings are not drawn to scale. The invention will be described and explained with additional specificity and detail through the use of the accompanying drawings in which.

ASPECTS OF EXEMPLARY EMBODIMENTS OF THE INVENTION

Included as part of this disclosure are various figures providing information concerning aspects of some exemplary embodiments of the invention. The figures are illustrative only and should not be construed to limit the scope of the invention in any way.

I. 8 G SFP Transceiver Capabilities and General Operation

Exemplary embodiments of the invention are concerned with an 2/4/8 Gb/s ("8 G") SFP transceiver that substantially comprises a 4 G SFP architecture. In this way, nominal rates of 8 G are achieved within a desired SFP MSA form factor while meeting performance standards, and without necessitating CDR data signal integrity compensation.

In general, 8 G nominal data rates are achieved with the 4 G SFP architecture. Such data rates may be achieved in this way for various protocols, one example of which is Fibre Channel. Note that the aforementioned 8 G nominal data rate is approximately 8.5 G in the Fibre Channel protocol, and may take other values in connection with other protocols. Accordingly, the scope of the invention is not limited simply to 8 Gb/s and 8.5 Gb/s data rates. In addition to supporting the nominal 8 G data rate, at least some embodiments of the invention are also backwards compatible with nominal 1/2/4 G data rates for protocols which include Fibre Channel. This is particularly useful since the transceiver can thus operate in connection with 1/2/4 G legacy systems.

As noted above, exemplary embodiments of the invention are able to achieve relatively high data rates, with acceptable performance, without requiring data signal integrity compensation. Elimination of data signal integrity compensation circuits and devices enables relatively low power dissipation to be achieved. In general, power dissipations in the region of about <1 W can be achieved. In some short wave applications, power dissipation is only about <600 mW, and in some long wave applications, power dissipation is only about <800 mW.

II. Exemplary 8.5 Gb/s SFP Transceiver Platform

Attention is directed now to some general aspects of an exemplary SFP transceiver. As noted above, one exemplary embodiment of the invention is concerned with a Fibre Channel compatible transceiver that is generally implemented in the form of a 4 G SFP transceiver, such as is employed in Fibre Channel and Ethernet applications. Because the transceiver is generally compliant with the SFP MSA, incorporated herein in its entirety by this reference, no data signal integrity compensation methods or circuitry are implemented in the exemplary transceiver and, as the disclosure herein indicates, no such data signal integrity compensation is necessary to achieve data rates such as 8.5 Gb/s.

Consistent with the foregoing, exemplary transceivers that do not require or implement CDR, or comparable, functionality may be referred to herein as comprising or implementing "uncompensated" data signal generation and/or processing components and circuitry. More generally, such transceivers may be referred to as comprising or embodying an "uncompensated" architecture. In similar fashion, operation of such exemplary transceivers may be referred to generally herein as "uncompensated" operation.

At least some embodiments of the invention comprise a 2/4/8 G SFP transceiver without CDR. Other embodiments are directed to a 4/8 G SFP transceiver without CDR. More generally, embodiments of the invention are concerned with SFP transceivers that are able to support some or all of the 1/2/4/8 G nominal data rates, although such transceivers may generally be referred to herein as an "8 G SFP transceiver."

In general, exemplary embodiments of the invention have the same port density as 1/2/4 G Fibre Channel and have an optical backward compatibility with 2/4 G Fibre Channel. Additionally, embodiments of the invention are electrically and mechanically backward compatible with 2/4 G Fibre Channel, that is, the electrical connector and cage of the transceiver are configured to interface with 2/4 G Fibre Channel systems and components. Thus, an exemplary embodiment of the 8 G SFP transceiver can be employed in connection with 2/4 G legacy systems, and legacy 2/4 G modules can be used in 8 G systems.

Depending upon the particular system with which the 8 G SFP transceiver is to be used, various aspects of the 8 G SFP transceiver may be adjusted or modified. As one example, if backward compatibility of the 8 G SFP transceiver is only needed for 2/4 G Fibre Channel, bandwidth tunability of the receiver may not be required. Correspondingly, some embodiments of the invention employ a receiver with a sensitivity of −19 dBm at 10.7 G. The receiver may or may not be a fixed bandwidth receiver.

Sample receiver sensitivity specifications include: −20 dBm (FTRJ8524) at 1.0626 G; −18 dBm (FTRJ8524) at 2.125 G; and, −15 dBm (FTRJ8524) at 4.25 G. One exemplary embodiment of the invention has a measured receiver sensitivity of −20 dBm (FTRJ8524) at 4.25 G. Another embodiment of the invention, using the exemplary HFD6x80-41 ROSA and Vitesse post amplifier discussed below, has a measured receiver sensitivity of −16 dBm (FTRJ8524) at 8.5 G, with an extinction ratio ("ER") of 3-4 dB and $10^{-10}$.

Figure 1:
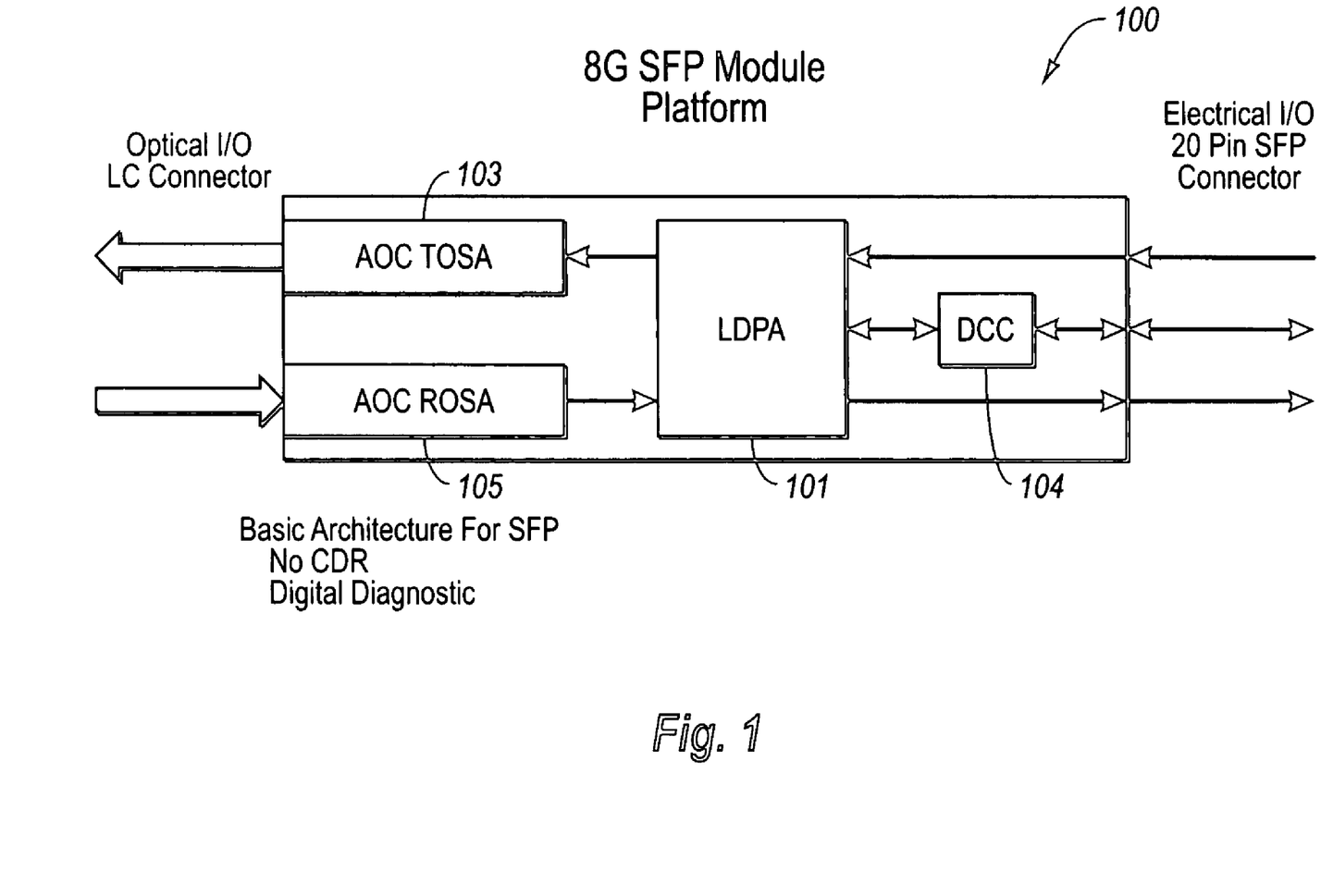
FIG. 1 is a high level schematic of an exemplary embodiment of an 8 G SFP module having a 4 G SFP architecture.
Figure 2A:
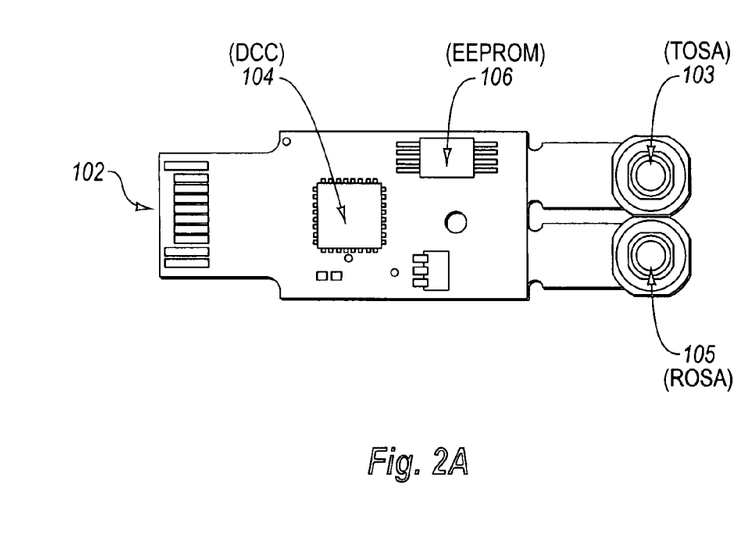
FIG. 2A is a view of a first side of an exemplary 8 G SFP board showing the arrangement of a ROSA, TOSA, EEPROM and FCC.
Figure 2B:
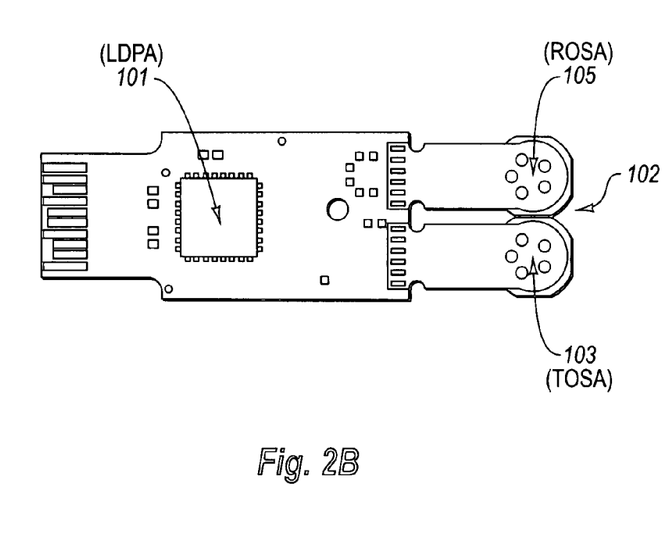
FIG. 2B is a view of a second side of an exemplary 8 G SFP board showing the arrangement of the ROSA, TOSA, and an LDPA.

With attention now to FIGS. 1 and 2, various aspects of an exemplary 8 G SFP transceiver module 100 are disclosed. In general, FIG. 1 is a block diagram illustrating aspects of an exemplary transceiver module 100, and FIG. 2 is a photograph of an 8 G board 102 that conforms to the SFP MSA.

As indicated, the disclosed embodiment does not employ or incorporate CDR data signal integrity compensation. The illustrated transceiver 100 includes an integrated LDPA 101 configured for communication with a TOSA 103 and a ROSA 105, where the ROSA 103 and TOSA 105 are nominally rated for 10 Gb/s operation. One example of such an LDPA 101 is a 4 G laser driver-post amplifier such as those produced by Vitesse Semiconductor Corporation ("Vitesse"). One particular Vitesse model that may be used is the Vitesse VSC7964 laser driver and limiting amplifier. However, other LDPAs of comparable functionality and configuration may alternatively be employed. Separate laser drivers and post-amplifiers may also be used in some embodiments of the invention.

Similarly, the TOSA 103 and ROSA 105 are exemplified by optoelectronic devices produced by Advanced Optical Components ("ADOPCO") of Richardson, Tex. In particular, the TOSA 103 may comprise, for example, an ADOPCO HFE6x9x-56 TOSA with an 850 nm vertical cavity surface emitting laser ("VCSEL") and having an associated nominal data rate of 10 G. The ROSA 105 may comprise, for example, an ADOPCO HFD6x80-41 ROSA with 850 nm P-I-N detector and preamp, and having an associated nominal data rate of 10 G. In the illustrated implementation, the ROSA 105 and TOSA 103 are hard-connected to the circuit board 102 of the transceiver 100. In alternative embodiments however, the ROSA and/or TOSA employ flex connections.

Any other ROSA and/or TOSA of comparable functionality, performance, and configuration may alternatively be employed however. For example, a ROSA and/or TOSA having a nominal data rate greater or less than 10 G may be employed in some cases. Note also that embodiments of the invention are not limited to 850 nm devices, and devices operating at other wavelengths may also be employed. As well, optical transmitters other than VCSELs may be employed. Examples of alternative optical transmitters include distributed feedback ("DFB") lasers and Fabry-Perot ("FP") lasers.

The exemplary 8 G SFP transceiver 100 further includes digital diagnostics systems and functionality, implemented in part by a diagnostics control chip ("DCC") 104 that interfaces with both internal and external devices. One suitable diagnostics control chip is an Atmel SL828 microcontroller, although other devices of comparable functionality and configuration may alternatively be employed.

As best illustrated in FIG. 2, the exemplary 8 G SFP transceiver 100 is configured so that the DCC 104 and the LDPA 101 are located on opposing sides of the transceiver circuit board so as to facilitate efficient use of the space in the transceiver housing. The illustrated embodiment further includes, among other things, an EEPROM 106.

Finally, it should be noted that aspects of embodiments of the invention may be modified as necessary to achieve the nominal 8 G rate in an SFP form factor. For example, the lengths of one or more traces of the transceiver board may be minimized to the extent that the exemplary implementation will permit, so as to enhance performance. In one particular embodiment, fixed electrical equalization and preemphasis may be implemented in the transceiver if particular traces, such as FR4 traces for example, exceed a certain length, such as about 2 to about 3 inches for example. Suitable trace lengths may vary from one embodiment to another but can be readily determined in various ways, such as through the use of a module demonstrator for example.

III. Examples of Operating Environments and Applications

Exemplary embodiments of the 8 G SFP transceiver are well suited for use in connection with the Fibre Channel protocol. However, the scope of the invention is not limited to any particular protocol.

In addition, embodiments of the transceiver represent solutions for a variety of different operating environments. As an example, the 8 G SFP transceiver can be used as a short wave solution for 100 m multimode fiber ("MMF") (50 µm 500 MHz km). As another example, the 8 G SFP transceiver can be used as a short wave solution for distances up to at least about 10 km using single mode fiber ("SMF").

Depending upon considerations such as link length, embodiments of the invention may take various forms. For example, 100 m short wave applications are suitable for employing an 850 nm VCSEL. Longer link lengths, such as 1-2 km long transceiver other than the optical emitter may additionally or alternatively be modified if necessary.

IV. Performance

Figure 3:
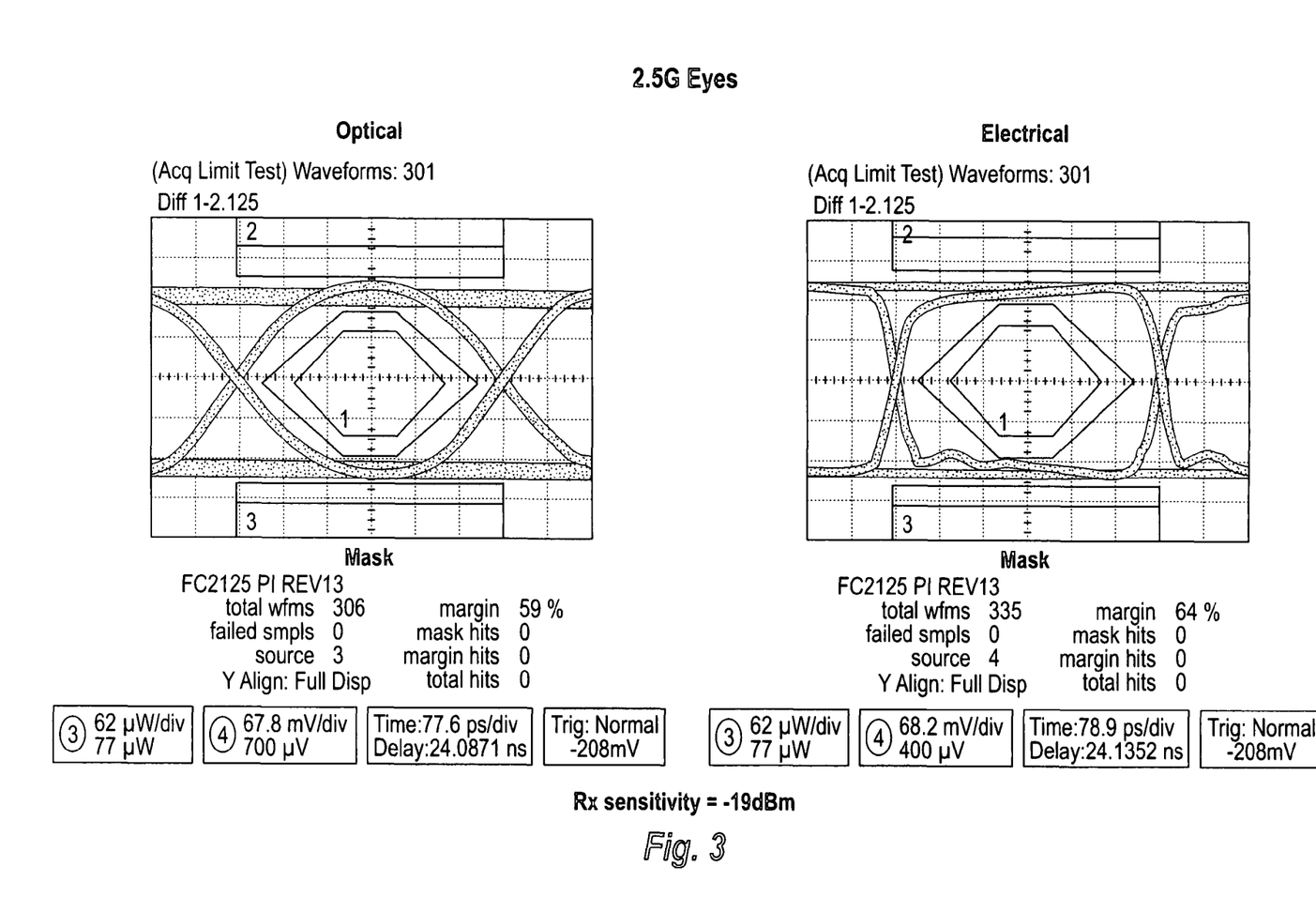
FIG. 3 indicates electrical and optical eye diagrams corresponding to operation of an exemplary embodiment of the 8 G SFP transceiver at about a 2.5 Gb/s data rate.
Figure 4:
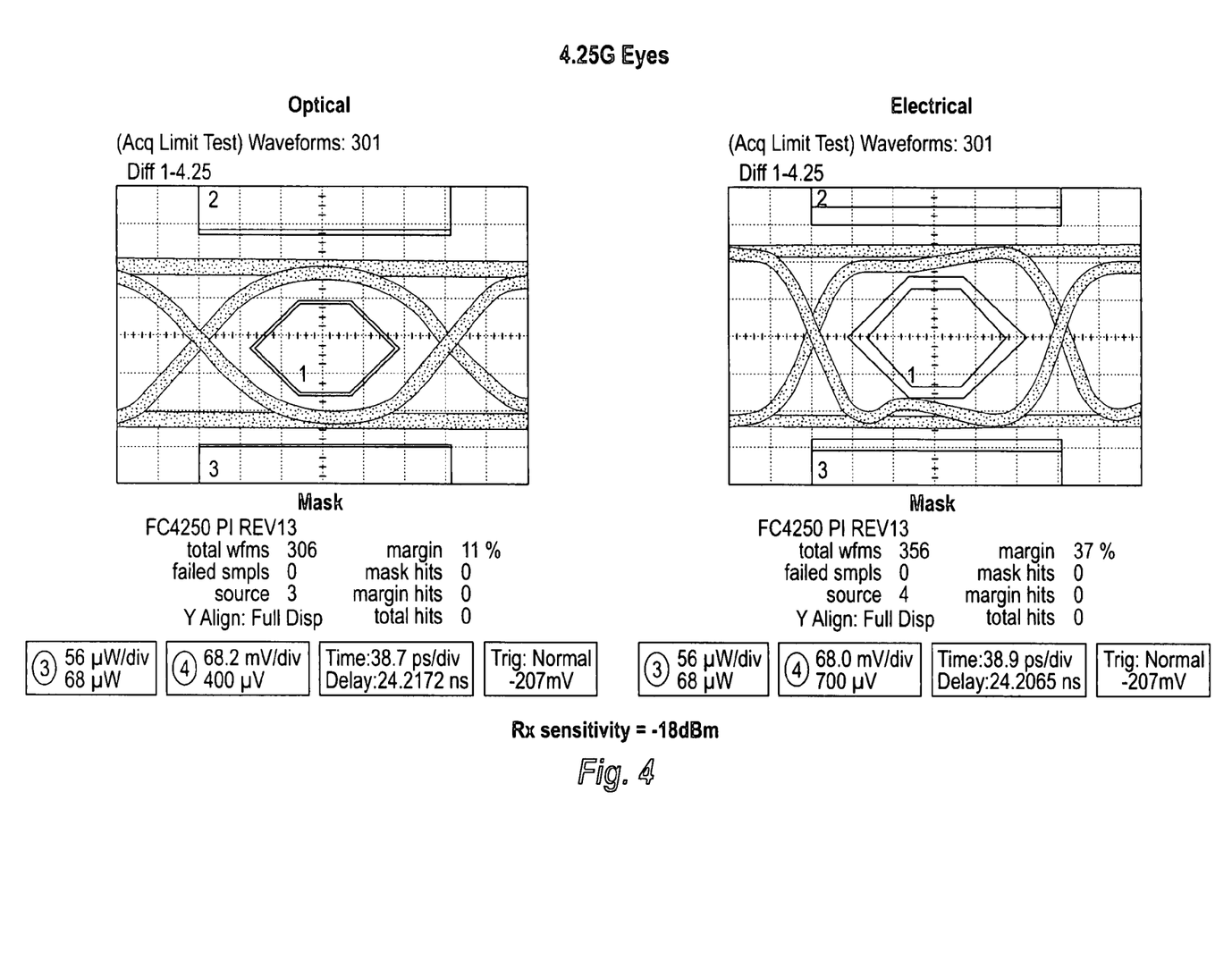
FIG. 4 indicates electrical and optical eye diagrams corresponding to operation an exemplary embodiment of the 8 G SFP transceiver at about a 4.25 Gb/s data rate.
Figure 5:
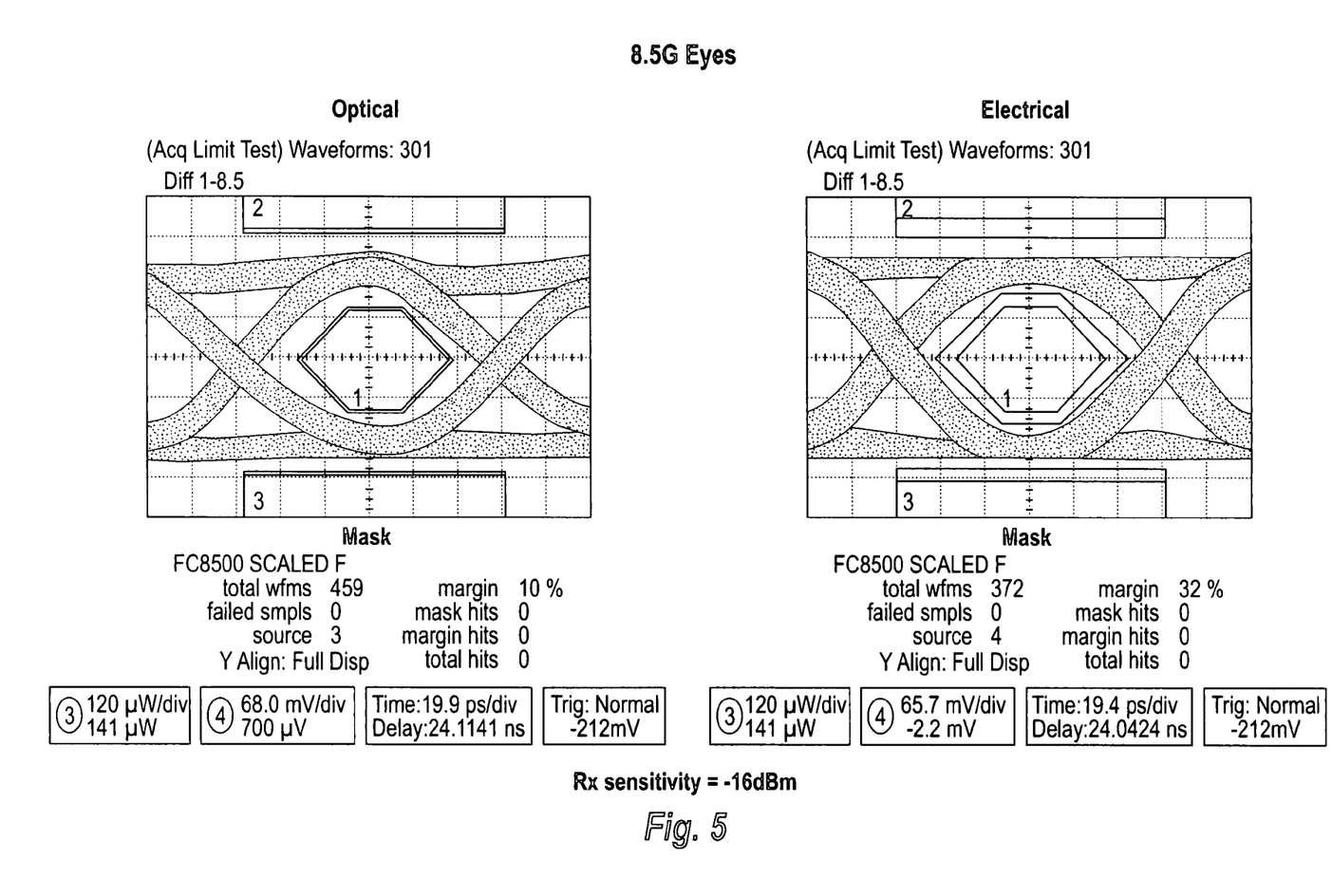
FIG. 5 indicates electrical and optical eye diagrams corresponding to operation of an exemplary embodiment of the 8 G SFP transceiver at about a 8.5 Gb/s data rate.

Directing attention finally to the optical and electrical eye diagrams designated as FIGS. 3-5, it can be seen that an exemplary embodiment of the 8 G SFP transceiver provides good performance at a variety of data rates. More particularly, FIGS. 3 through 5 indicate that both optical and electrical masks are maintained at the following data rates: 2.5 G (Rx sensitivity of −19 dBm); 4.25 G (Rx sensitivity −19 dBm); and, 8.5 G (Rx sensitivity −16 dBm). It should be noted with regard to FIG. 4 that the distortion in the upper portion of the optical eye diagram is due to a bad connector, and does not reflect any shortcoming in the construction, arrangement or performance of the associated transceiver. Thus, embodiments of the invention are able to employ a 4 G SFP architecture to successfully operate at relatively high data rates, such as 8.5 Gb/s or higher, without CDR or comparable compensation, while maintaining compliance with operational standards and requirements such as masks and eye diagram requirements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module, comprising:
    an uncompensated architecture that does not implement clock and data recovery (CDR) compensation and is configured to transmit and receive data at a rate of about 8.5 Gb/s, the uncompensated architecture including:
        a TOSA;
        a ROSA;
        a printed circuit board having an SFP electrical connector configured for communication with a host;
        an LDPA disposed on the printed circuit board and configured for communication with the TOSA and the ROSA; and
        at least one optical connector in communication with at least one of: the ROSA; and, the TOSA.

2. The transceiver module as recited in claim 1, wherein the uncompensated architecture is compliant with the SFP MSA.

3. The transceiver module as recited in claim 1, wherein the TOSA and the ROSA are each capable of performing at a data rate of about 10 Gb/s.

4. The transceiver module as recited in claim 1, wherein the TOSA includes one of: a DFB laser; an 850 nm VCSEL; and, an FP laser.

5. The transceiver module as recited in claim 1, wherein the ROSA includes an 850 nm P-I-N detector and preamp.

6. The transceiver module as recited in claim 1, wherein the transceiver module dissipates less than about one watt of power during operation.

7. The transceiver module as recited in claim 6, wherein the transceiver module dissipates less than about 600 milliwatts of power during operation.

8. The transceiver module as recited in claim 6, wherein the transceiver module dissipates less than about 800 milliwatts of power during operation.

9. The transceiver module as recited in claim 1, wherein, during operation, the transceiver module maintains compliance with a standard eye diagram requirement.

10. A transceiver module, comprising:
    an architecture that is compliant with the SFP MSA and that is configured to transmit and receive data at a rate of about 8.5 Gb/s, wherein the architecture includes:
        a TOSA;
        a ROSA;

a printed circuit board having an SFP electrical connector configured for communication with a host;

an LDPA disposed on the printed circuit board and configured for communication with the TOSA and the ROSA; and at least one optical connector in communication with at least one of: the ROSA; and, the TOSA.

11. The transceiver module as recited in claim 10, wherein the TOSA and the ROSA are each capable of performing at a data rate of about 10 Gb/s.

12. The transceiver module as recited in claim 10, wherein the TOSA includes one of: a DFB laser; an 850 nm VCSEL; and, an FP laser.

13. The transceiver module as recited in claim 10, wherein the ROSA includes an 850 nm P-I-N detector and preamp.

14. A transceiver module, comprising:

an uncompensated architecture that does not include CDR circuitry and is configured to transmit and receive data at a rate of about 8.5 Gb/s, the uncompensated architecture including:

a TOSA;

a ROSA;

a printed circuit board having a first side and a second side opposing the first side and an SFP electrical connector configured for communication with a host;

an LDPA disposed on the first side of the printed circuit board and configured for communication with the TOSA and the ROSA;

a DCC disposed on the second side of the printed circuit board that interfaces with the LDPA and with external device to provide diagnostics; and at least one optical connector in communication with at least one of: the ROSA; and, the TOSA.

15. The transceiver module as recited in claim 14, wherein the uncompensated architecture is compliant with the SFP MSA.

16. The transceiver module as recited in claim 14, wherein the TOSA and the ROSA are each capable of performing at a data rate of about 10 Gb/s.

17. The transceiver module as recited in claim 14, wherein the TOSA includes one of: a DFB laser; an 850 nm VCSEL; and, an FP laser.

18. The transceiver module as recited in claim 14, wherein the ROSA includes an 850 nm P-I-N detector and preamp.

* * * * *

UNITED STATES PATENT AND TRADEMARK OFFICE
CERTIFICATE OF CORRECTION

PATENT NO. : 7,970,283 B2  
APPLICATION NO. : 11/074609  
DATED : June 28, 2011  
INVENTOR(S) : Giaretta et al.

Page 1 of 1

It is certified that error appears in the above-identified patent and that said Letters Patent is hereby corrected as shown below:

On the Face Page, in Field (74), under "Attorney, Agent or Firm", in Column 2, Line 1,
delete "Mashofff Gilmore & Israelsen" and insert -- Maschoff Gilmore & Israelsen --, therefor.

Signed and Sealed this
Twenty-fourth Day of July, 2012

David J. Kappos
*Director of the United States Patent and Trademark Office*